G. C. SHOEMAKER.
SPRING CONSTRUCTION.
APPLICATION FILED JAN. 20, 1909.

935,933.

Patented Oct. 5, 1909.

3 SHEETS—SHEET 1.

Witnesses  Inventor

G. C. SHOEMAKER.
SPRING CONSTRUCTION.
APPLICATION FILED JAN. 20, 1909.
935,933.
Patented Oct. 5, 1909.
3 SHEETS—SHEET 2.
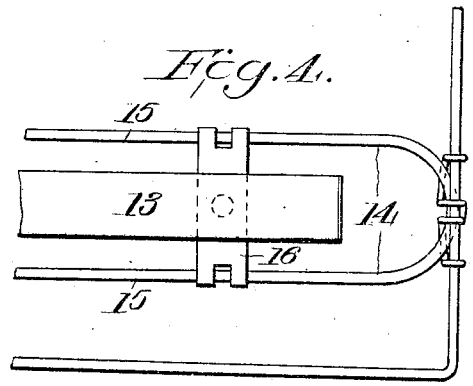
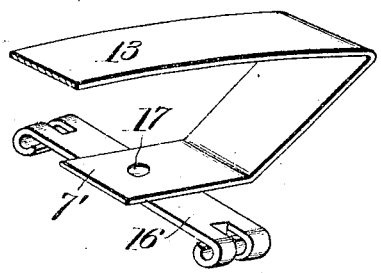
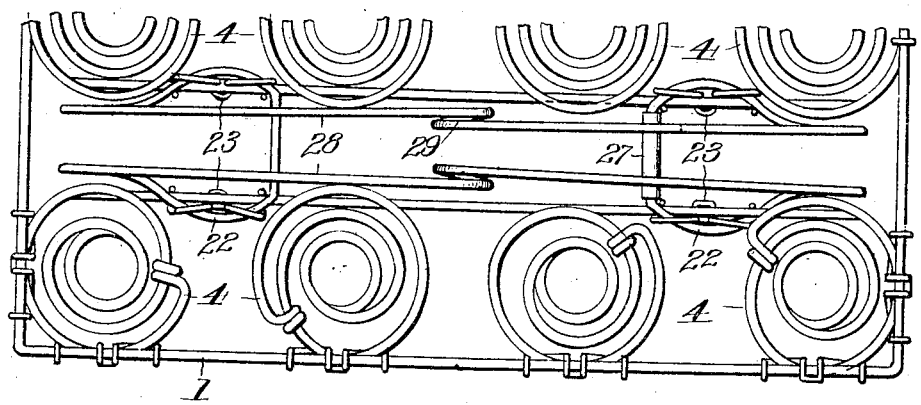
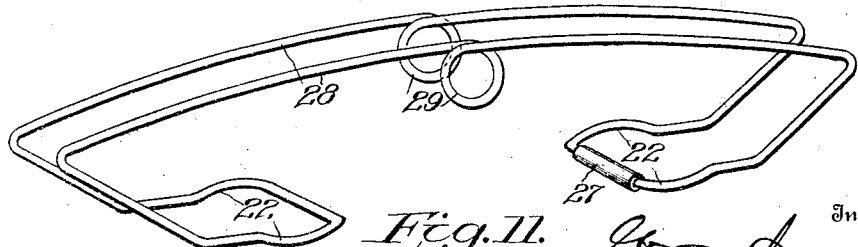
Witnesses
Inventor

G. C. SHOEMAKER.
SPRING CONSTRUCTION.
APPLICATION FILED JAN. 20, 1909.

935,933.

Patented Oct. 5, 1909.
3 SHEETS—SHEET 3.

Witnesses
C. H. Walker
E. S. Dalton

Inventor

UNITED STATES PATENT OFFICE.

GEORGE C. SHOEMAKER, OF WASHINGTON, DISTRICT OF COLUMBIA, ASSIGNOR TO JACKSON CUSHION SPRING COMPANY, OF JACKSON, MICHIGAN.

SPRING CONSTRUCTION.

935,933.  Specification of Letters Patent.  Patented Oct. 5, 1909.

Application filed January 20, 1909. Serial No. 473,327.

*To all whom it may concern:*

Be it known that I, GEORGE C. SHOEMAKER, a citizen of the United States, residing at Washington, in the District of Columbia, have invented certain new and useful Improvements in Spring Constructions, of which the following is a specification.

This invention relates to spring constructions.

One object of the invention is to provide a spring construction for automobile or other seats embodying such characteristics that the rider of the structure will not be injured or inconvenienced by reason of contact with the support upon which the structure is mounted in the event that the seat should be unduly compressed or jarred incident to the weight of a heavy rider or by reason of the vehicle contacting with an obstruction in the roadway.

Another object is to reinforce the main springs of the structure with one or more arch springs adapted to be compressed only when the structure is subjected to unusual weight, whereby the auxiliary springs will catch the extra weight and prevent the structure from being wholly compressed, the arch springs being so mounted that when compressed there will not be a noise nor a spreading of the main frame of the structure.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

Figures 1, 2:
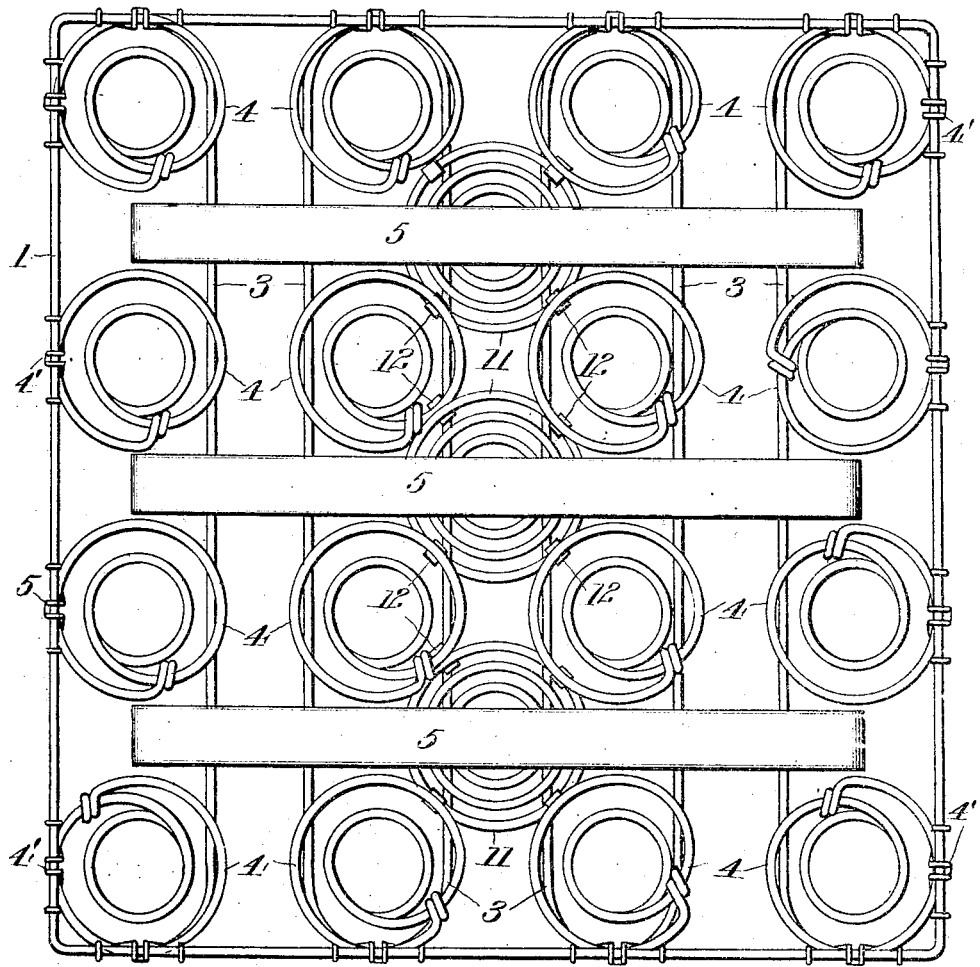
Figure 3:
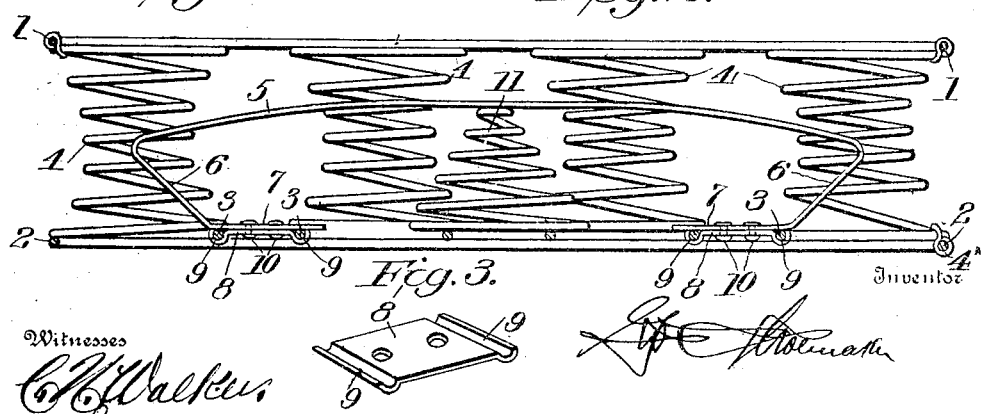
Figure 6:
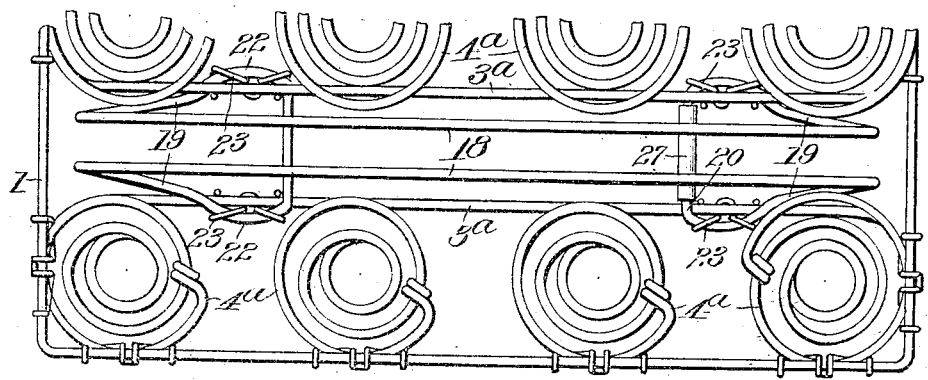
Figure 7:
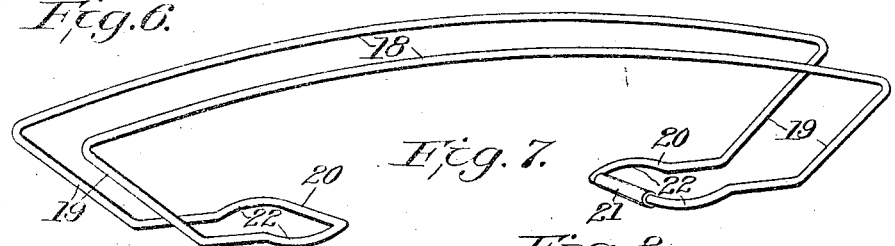
Figure 8:
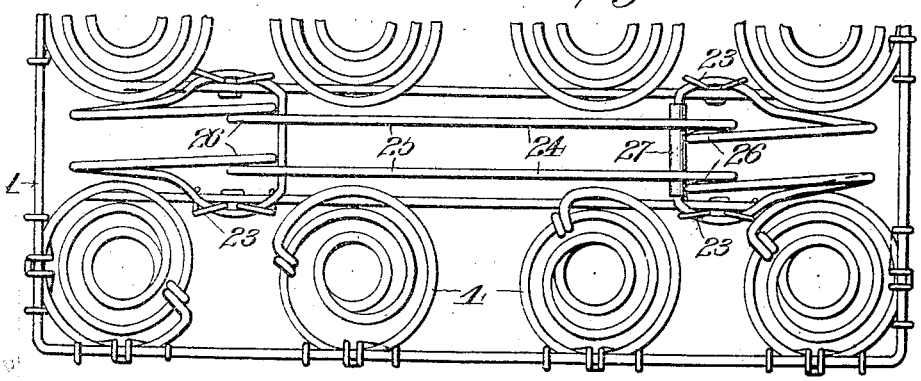
Figure 9:
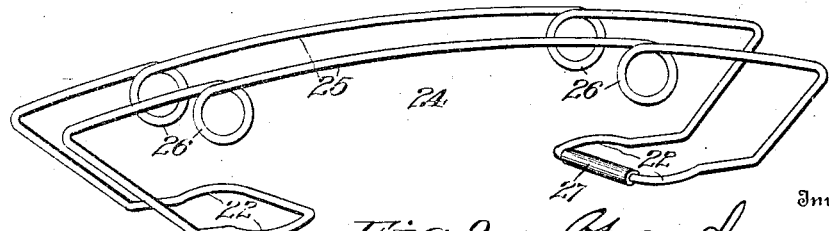

In the drawings:—Figure 1 is a top plan view of my invention. Fig. 2 is a longitudinal sectional view. Fig. 3 is a detail perspective view of the clamping plate to which the feet of the preferred form of auxiliary spring are secured. Fig. 4 is a fragmentary plan view of a spring construction embodying a modified form of clip to which the preferred auxiliary spring may be secured. Fig. 5 is a detail perspective view of the modified clip or plate to which the preferred form of spring may be secured. Fig. 6 is a fragmentary top plan view of a spring construction illustrating a second form of auxiliary spring. Fig. 7 is a detail perspective view of the modified auxiliary spring illustrated in Fig. 6. Fig 8 is a fragmentary top plan view of a third modification. Fig. 9 is a detail perspective view of the modified auxiliary spring illustrated in Fig. 8. Fig. 10 is a fragmentary top plan view of a fourth form of invention. Fig. 11 is a detail perspective view of the modified auxiliary spring illustrated in Fig. 10.

Referring now to the accompanying drawings, the reference characters 1 and 2 indicate upper and lower edge wires of the frame which may be of rectangular or any other formation.

Disposed within the frame are spring supporting wires 3 upon which are mounted main springs 4, and which are secured to the supporting wires by means of any suitable type of clips 4'. The body 5 of each arch spring extends nearly across the construction, but prior to reaching the sides thereof, it has its opposite ends directed downwardly and inwardly upon an incline to form the downwardly converging legs 6, which terminate in substantially horizontally disposed feet portions 7, the feet being disposed beneath the body 6 of the corresponding auxiliary springs. It will thus be understood that the auxiliary springs do not extend to the sides of the structure, and that therefore, when they are compressed subsequent to the initial compression of the main springs, the ends of the auxiliary springs cannot project beyond the sides of the structure or in any way cause a truss action between the auxiliary springs and the frame. As a matter of fact, if the pressure falls upon the auxiliary springs substantially intermediate their ends, as is usual, the ends of the auxiliary springs at the tops of their legs 6 tend to draw toward each other rather than project outwardly toward the edge of the frame. I rigidly secure the feet 7 of the auxiliary springs immediately beneath the body 6 thereof, in order to obviate the above-mentioned truss or spreading action of the frame or the projection of the auxiliary springs beyond the latter, and by rigidly mounting the feet in the structure, I obviate noise, when the auxiliary springs are compressed. The feet 7 of the auxiliary springs may be secured in the frame in any suitable manner, but one method for securing the feet fixedly to the structure resides in the employment of plates 8 which have their ends bent to provide grooves 9 to embrace adjacent supporting wires 3. These plates are disposed immediately beneath the feet 7 and are clamped thereto and upon the corresponding supporting wires by means of rivets or other suitable means 10, as clearly shown in the accompanying drawings.

Under certain conditions, it may be preferable to reinforce the action of the auxiliary springs, and if so, I may employ one or more coiled springs 11 and secure them in the frame in any suitable manner beneath the bodies of the auxiliary springs. If desired, the reinforcing or cushioning springs 11 may be secured at four points to the corresponding main springs by means of suitable clips 12, as shown in Fig. 1, and said cushioning springs 11 may be eliminated from the structure altogether, if desired.

In Figs. 4 and 5 there is illustrated a form of auxiliary spring 13 similar to the auxiliary spring illustrated in Figs. 1 to 3, inclusive, but there is shown a different means for fixedly mounting the ends of the auxiliary spring 13. For instance, I employ the endless supporting wires 14 for the main springs of the structure, whose parallel members 15 are connected by the double ended clip 16, to which latter the feet 7' of the auxiliary spring 13 are secured by a rivet or any other suitable means 17.

In Figs. 6 and 7 I illustrate a modified form of auxiliary spring composed of a single piece of wire bent to provide the spaced body portions 18, the leg portions 19 and feet portions 20. I thus provide a pair of auxiliary springs between adjacent rows of main springs 4ᵃ, forming the pairs of auxiliary springs of a single piece of wire, with the opposite ends of the wire coupled together by means of a suitable sleeve 21, as shown. It will be seen that the feet portions 20 in this third modified form are slightly bowed at 22 and at their bowed portions are secured to the supporting wires 3ᵃ by means of suitable clips 23. Substantially the only difference between this form of auxiliary spring and the first two forms is that in the third form the auxiliaries are formed of spring wire instead of flat spring metal. The parallel members 18 of this third form may be truly regarded as the body portion of the auxiliary spring provided at each end with a leg 19 and a foot 20; or the same may be considered as a pair of auxiliary springs, each spring of each pair having a leg and a foot portion. The third mentioned auxiliaries perform the same function as outlined in the other forms of the invention described.

In Figs. 8 and 9, the auxiliary springs 24 are the same in formation as in the third described form of the invention, the only material difference residing in the parallel members 25 of the auxiliary springs 24 being each provided with a pair of coils 26 with the parallel members connected together intermediate their ends by a clip 27.

In Figs. 10 and 11 there is a fifth form of invention similar to the third and fourth modified forms, the only material difference residing in the parallel members 28 of the auxiliary springs 29 each having a single coil 30 intermediate its ends.

In all forms of the invention the auxiliary springs are preferably formed of spring material and each includes one or more legs at its opposite ends which incline inwardly and terminate in feet portions, which latter are adapted to be secured in any suitable manner to the supporting wires of the structure with the ends of the body portions of the springs terminating short of the frame of the structure, so that upon compression of the auxiliary springs they will not be projected beyond the body of the frame or cause a spreading of the latter, and as hereinbefore intimated, by fixedly mounting the feet portions of the springs within the frame in spaced relation of the latter, there is not a noise caused incident to compression of the auxiliaries. Hence, all of the auxiliary springs possess the same functional characteristics. If desired all of the modified types of auxiliary springs may have a spring beneath them as in the first form, but in view of the illustration in Figs. 1 and 2 it is deemed entirely unnecessary to illustrate the reinforcing spring 11 in the modified forms.

What is claimed is:—

1. In a spring construction, a frame, main springs in the frame, and an auxiliary arch spring in the frame to catch the extra weight having its ends fixedly mounted within the frame and in spaced relation to the latter.

2. In a spring construction, a frame, main springs in the frame, and an auxiliary arch spring to catch the extra weight having its ends terminating beneath its body portion with said ends and the body portion in spaced relation to the frame, the ends being fixedly mounted within the frame in spaced relation thereto.

3. In a spring construction, a frame, main springs in the frame, and auxiliary arch springs in the frame between adjacent rows of main springs to sustain extra weight, each auxiliary spring having its ends fixedly mounted within the frame and in spaced relation to the latter.

4. In a spring construction, a frame, main springs in the frame, auxiliary arch springs in the frame between adjacent rows of main springs to sustain extra weight, each auxiliary spring having its ends fixedly mounted the latter, and means beneath each arch spring to cushion the latter.

5. In a spring construction, a frame, supporting wires in the frame, plates connecting pairs of said supporting wires at opposite sides of the construction, an auxiliary arch spring in the frame to catch the extra weight and provided at its ends with feet portions for engagement with said plates, and means for securing said plates and feet portions together.

6. In a spring construction, a frame, main springs in the frame, an auxiliary arch spring in the frame having its ends fixedly mounted in the frame and in spaced relation thereto, and means for cushioning the auxiliary spring.

7. In a spring construction, a frame, main springs in the frame, an auxiliary arch spring in the frame having its ends fixedly mounted in the frame and in spaced relation thereto, and a spring beneath the arch spring for coöperation with the latter to sustain extra weight.

8. In a spring construction, a frame, main springs in the frame, an auxiliary arch spring in the frame to catch the extra weight, said arch spring being formed of a single piece of material and having its ends converging downwardly and terminating in feet portions, means for securing the feet portions against movement, and a spring beneath the arch spring.

9. In a spring construction, a frame, main springs in the frame, an auxiliary arch spring to catch the extra weight having its ends terminating beneath its body portion and fixedly mounted in spaced relation to the frame, the body of each auxiliary spring also being in spaced relation to the frame, and means for cushioning the auxiliary spring.

10. In a spring construction, a frame, main springs in the frame, an auxiliary arch spring to catch the extra weight having its ends terminating beneath its body portion and in spaced relation to the frame, the body of each auxiliary spring also being in spaced relation to the frame, and means for securing the ends of the auxiliary spring against movement.

11. In a spring construction, a frame, main springs in the frame, an auxiliary arch spring to catch the extra weight having its ends terminating beneath its body portion and in spaced relation to the frame, the body of the auxiliary spring also being in spaced relation to the frame, means for cushioning the auxiliary spring, and means for securing the ends of the auxiliary spring against movement.

12. In a spring construction, upper and lower edge wires constituting a frame, main springs in the frame, an auxiliary spring in the frame having its opposite ends terminating substantially in the same plane as the lower edge wire, and means for securing said ends of the auxiliary spring against movement within the frame and in spaced relation to the lower edge wire.

13. In a spring construction, upper and lower edge wires constituting a frame, main springs in the frame, an auxiliary spring in the frame having its opposite end terminating substantially in the same plane as the lower edge wire, means for securing said ends of the auxiliary spring against movement within the frame and in spaced relation to the lower edge wire, and means beneath the auxiliary spring to cushion the latter.

14. In a spring construction, a frame, supporting wires in the frame, main springs secured to the supporting wires, and an auxiliary arch spring in the frame having its ends secured to the supporting wires upon which the main springs are mounted.

15. In a spring construction, a frame, supporting wires in the frame, main springs secured to the supporting wires, and an auxiliary arch spring in the frame having its ends secured to the supporting wires upon which the main springs are mounted, the arch spring extending in a direction at a right angle to the plane of said supporting wires.

16. In a spring construction, a frame, supporting wires in the frame, main springs mounted upon said supporting wires, an auxiliary arch spring in the frame between adjacent rows of main springs to sustain the extra weight, said arch spring being formed of a single piece of material and having its ends converging downwardly and terminating in inwardly directed feet portions, plates connected to the supporting wires upon which the inwardly directed ends of the arch spring are mounted, and means for securing said plates and ends of the arch spring together.

17. In a spring construction, a frame, main springs in the frame, and an auxiliary arch spring in the frame to sustain extra weight, the arch spring being formed of a single piece of material having downwardly converging leg portions and inwardly directed feet portions fixedly secured within the frame in spaced relation to the latter.

In testimony whereof I affix my signature, in presence of two witnesses.

GEORGE C. SHOEMAKER.

Witnesses:
JOHN H. SIGGERS,
DAVID R. WAGNER.